(12) United States Patent
Ito et al.

(10) Patent No.: US 10,499,565 B2
(45) Date of Patent: Dec. 10, 2019

(54) GRASS MOWER MACHINE (71) Applicant: Kubota Corporation, Osaka-shi (JP)

(72) Inventors: Hirokazu Ito, Sakai (JP); Kazuo Koike, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/338,742

(22) Filed: Oct. 31, 2016

(65) Prior Publication Data

US 2017/0135283 A1 May 18, 2017

(30) Foreign Application Priority Data

Nov. 12, 2015 (JP) ................. 2015-222214

(51) Int. Cl.
| | | |
|---|---|---|
| *A01D 34/78* | (2006.01) | |
| *A01D 34/66* | (2006.01) | |
| *A01D 34/74* | (2006.01) | |
| *A01D 34/81* | (2006.01) | |
| *A01D 101/00* | (2006.01) | |

(52) U.S. Cl.
CPC ............. *A01D 34/78* (2013.01); *A01D 34/66* (2013.01); *A01D 34/664* (2013.01); *A01D 34/74* (2013.01); *A01D 34/81* (2013.01); *A01D 2101/00* (2013.01)

(58) Field of Classification Search
CPC ........ A01D 34/76; A01D 34/78; A01D 69/02; A01D 69/025
See application file for complete search history.

(56) References Cited

U.S. PATENT DOCUMENTS

| | | | |
|---|---|---|---|
| 5,287,682 A | * | 2/1994 | Rautenbach ........... A01D 34/76 56/13.6 |
| 8,042,322 B1 | | 10/2011 | Wyatt |
| 8,191,343 B1 | | 6/2012 | Hauser et al. |
| 8,572,939 B2 | | 11/2013 | Koike et al. |
| 2004/0237492 A1 | | 12/2004 | Samejima et al. |
| 2008/0264026 A1 | * | 10/2008 | Ishii ....................... A01D 34/44 56/10.8 |
| 2009/0178382 A1 | | 7/2009 | Sugio et al. |
| 2010/0031620 A1 | | 2/2010 | Uemura et al. |

(Continued)

FOREIGN PATENT DOCUMENTS

| | | |
|---|---|---|
| JP | 05000019 U | 5/1993 |
| JP | 2004350630 A | 12/2004 |
| JP | 2008265685 A | 11/2008 |

(Continued)

*Primary Examiner* — Alicia Torres
(74) *Attorney, Agent, or Firm* — The Webb Law Firm (57) ABSTRACT A grass mower machine includes a mower deck 30 that protrudes from a frame unit in a machine body transverse direction, cutter blades 20 attached respectively to a first rotation shaft 21, a second rotation shaft 22 and a third rotation shaft 23 that are disposed side by side and spaced apart from each other in the machine body transverse direction, a first power transmitting body 71 for transmitting power from an output shaft 41 of an electric motor 4 which is disposed on an outer side of rotation paths of the cutter blades 20 as seen in a plane view to the first rotation shaft 21, a second power transmitting body 72 for transmitting power from the first rotation shaft 21 to the second rotation shaft 22, and a third power transmitting body 73 for transmitting power from the second rotation shaft 22 to the third rotation shaft 23.

3 Claims, 9 Drawing Sheets (56) References Cited

U.S. PATENT DOCUMENTS

2011/0247886 A1* 10/2011 Sasahara ............... A01D 69/02
                                                   180/6.5
2015/0201556 A1   6/2015 Ito et al.

FOREIGN PATENT DOCUMENTS

| JP | 2009195206 A | 9/2009 |
|----|--------------|--------|
| JP | 2010035491 A | 2/2010 |
| JP | 2011218951 A | 11/2011 |
| JP | 2015136305 A | 7/2015 |

* cited by examiner

GRASS MOWER MACHINE

CROSS-REFERENCE TO RELATED APPLICATION

This application claims priority to Japanese Patent Application No. 2015-222214 filed Nov. 12, 2015, the disclosure of which is hereby incorporated in its entirety by reference.

BACKGROUND OF THE INVENTION

Field of the Invention

The present invention relates to a grass mower machine including a mower deck attached to a machine body via a lift mechanism to be adjustable in its ground height and an electric motor for providing power to a rotation shaft configured to rotate a cutter blade disposed inside the mower deck.

Description of the Related Art

A vehicle disclosed in the specification of the U.S. Pat. No. 8,042,322 includes a mower deck, a rotation shaft supported to the mower deck side by side and extending in a vertical direction, and a cutter blade fixed to a lower end of this rotation shaft. On an upper wall face of the mower deck, an electric motor is disposed with lateral orientation between two rotation shafts. An output shaft of the electric motor extends horizontally from opposed ends of the electric motor toward the respective rotation shafts. As the output shaft and the rotation shafts are connected via a bevel gear, so that with drive of the electric motor, the cutter blade is rotated. If this arrangement is used in a mower having a mower deck that is attached to a machine body via a lift mechanism to be adjustable in its ground height, a space above the top wall of the mower deck is largely occupied by the electric motor and the bevel gear. Thus, the gap between the electric motor, the bevel gear and the machine body is small, which makes it difficult to secure a sufficient ground height for the mower deck. If the height of the machine body is increased in order to secure a sufficient ground height (lift stroke) for the mower deck, this will invite inconvenience of elevation of the center of gravity of the machine body.

A lawn tractor (a grass mower machine) disclosed in the specification of the U.S. Pat. No. 8,191,343 includes a mower deck mounting three cutter blades side by side. Of the three cutter blades, the center cutter blade is attached to a lower end of a center rotation shaft whose upper end is coupled to an output shaft of an electric motor. The left rotation shaft attached with the left cutter blade and the right rotation shaft attached with the right cutter blade, of the three cutter blades, receive power from the center rotation shaft via a belt transmission. The electric motor is disposed at the highest position of the mower deck. A controller for supplying electric power to the electric motor is disposed in a region surrounded by the center rotation shaft, the left rotation shaft and the right rotation shaft on the top wall of the mower deck, and its ground height is lower than that of the electric motor. In this lawn tractor too, the electric motor is disposed at an upper end of the center rotation shaft, so the gap between the electric motor and the machine body is small, which makes it difficult to secure a sufficient ground height for the mower deck.

An electric grass mower machine disclosed in the specification of the U.S. Pat. No. 8,572,939 includes a mower deck mounting three cutter blades side by side. Electric motors are disposed at upper ends of rotation shafts of all the cutter blades, and power supply to the respective electric motor is done by a power supply system comprised of an inverter and a battery mounted on the machine body. With this electric grass mower machine too, the gaps between the electric motors and the machine body are small, which makes it difficult to secure a sufficient ground height for the mower deck.

With the conventional mower decks described above, cutter blade driving devices such as a gear mechanism, an electric motor, etc. having relatively large heights are disposed upwardly of a rotation shaft of the cutter blade. So, it was difficult to secure a sufficient lift stroke for the mower deck. For this reason, there is a need for a grass mower machine that makes it possible to secure a sufficient space between a mower deck and a machine body frame so as to secure a sufficient lift stroke for the mower deck.

SUMMARY OF THE INVENTION

A grass mower machine according to the present invention comprises:

- a frame unit that extends in a machine body front-rear direction;
- a mower deck that protrudes from the frame unit in a machine body transverse direction and that is supported to the frame unit via a lift mechanism;
- a first rotation shaft, a second rotation shaft and a third rotation shaft that are disposed side by side and spaced apart from each other in the machine body transverse direction and that extend through an upper wall of the mower deck upwardly;
- cutter blades attached to the first rotation shaft, the second rotation shaft and the third rotation shaft inside the mower deck;
- an electric motor disposed on an outer side of rotation paths of the cutter blades as seen in a plan view;
- an output shaft of the electric motor, the output shaft extending upwardly from the electric motor;
- a first power transmitting body that extends above the top wall of the mower deck to transmit power from the output shaft to the first rotation shaft;
- a second power transmitting body that extends above the top wall of the mower deck to transmit power from the first rotation shaft to the second rotation shaft; and
- a third power transmitting body that extends above the top wall of the mower deck to transmit power from the second rotation shaft to the third rotation shaft.

With the above-described arrangement, since the electric motor is disposed on the outer side of rotation paths of the plurality of cutter blades, it is possible to lower the disposing position of the electric motor to a position disposed sideways the cutter blade spaces. With this, it becomes possible to avoid limitation on the lift stroke of the mower deck, which would be imposed due to possible interference between the electric motor and the lower face of the frame unit. Further, with this arrangement, the second rotation shaft is disposed at the center in the machine body transverse direction, whereas the first rotation shaft is disposed on one lateral side of the second rotation shaft and the third rotation shaft is disposed on the other lateral side of the second rotation shaft, respectively. In this, with an arrangement such that rotation paths of the cutter blades attached respectively thereto are overlapped with each other in the machine body front-rear direction (machine body traveling direction), it is possible to obtain a cutting width producing no cutting leftovers. Incidentally, in the case of rotatably driving a plurality of cutter blades by a single electric motor, if the rotational power of the electric motor is transmitted to the second rotation shaft disposed at the center, which in turn transmits the power therefrom to the first rotation shaft and the third rotation shaft in distribution, a power distributor needed to be provided in the second rotation shaft will tend to be large. As a result, a distance from the upper end of the second rotation shaft to the frame unit will be short, which will result in the inconvenience of inability to secure a sufficient lift stroke for the mower deck. On the other hand, with the above-described inventive arrangement, the rotational power of the electric motor is transmitted to the first rotation shaft which is disposed on the outer side in the machine body transverse direction and then transmitted from the first rotation shaft to the second rotation shaft and then transmitted finally from the second rotation shaft to the third rotation shaft. As a result, the power distributors needed to be provided in the first rotation shaft and the second rotation shaft are relatively small. As a result, it is possible to secure a relatively large space for the lift stroke for the mower deck.

Further, in the above-described arrangement, preferably, the first power transmitting body, the second power transmitting body and the third power transmitting body, which are comprised of belts, chains, etc., are disposed horizontally, and a height of the first power transmitting body from the mower deck is set equal to a height of the third power transmitting body from the mower deck. With this arrangement, the height needed by the power transmitting body for transmitting rotation of the electric motor to the cutter blade upwardly of the mower deck becomes substantially equal to the combined height of two power transmitting bodies. Thus, it becomes easier to secure the needed lift stroke for the mower deck.

A grass mower machine according to a further aspect of the present invention, comprises:
- a frame unit that extends in a machine body front-rear direction;
- a mower deck that is attached to the frame unit via a lift mechanism to be adjustable in its ground height and that protrudes from the frame unit in a machine body transverse direction;
- a first rotation shaft that extends through a top wall of the mower deck and that extends upwards off the frame unit in the machine body transverse direction;
- a second rotation shaft that extends through the top wall of the mower deck and spaced from the first rotation shaft in the machine body transverse direction;
- cutter blades attached respectively to the first rotation shaft and the second rotation shaft inside the mower deck;
- an electric motor that is disposed on an outer side of rotation paths of the cutter blades as seen in a plan view;
- an output shaft of the electric motor that extends upwardly from the electric motor;
- a first power transmitting body that extends above the top wall of the mower deck to transmit power from the output shaft to the first rotation shaft; and
- a second power transmitting body that extends above the top wall of the mower deck to transmit power from the first rotation shaft to the second rotation shaft.

This grass mower machine is of the type configured to provide a cutting width by disposing two cutter blades side by side. With this arrangement, the power of the electric motor is transmitted firstly to the first rotation shaft that extends upwards off the frame unit in the machine body transverse direction and then the power taken off the first rotation shaft is transmitted to the second rotation shaft. Therefore, the first rotation shaft will require a power receiving portion for receiving the power from the electric motor and a power distributing portion for distributing power to the second rotation shaft. However, as the upper side of the power distributing portion is deviated from the frame unit, the first rotation shaft that includes the power distributing portion does not interfere with the frame unit when the mower deck is lifted up.

DETAILED DESCRIPTION OF THE PREFERRED EMBODIMENTS

Figure 1:
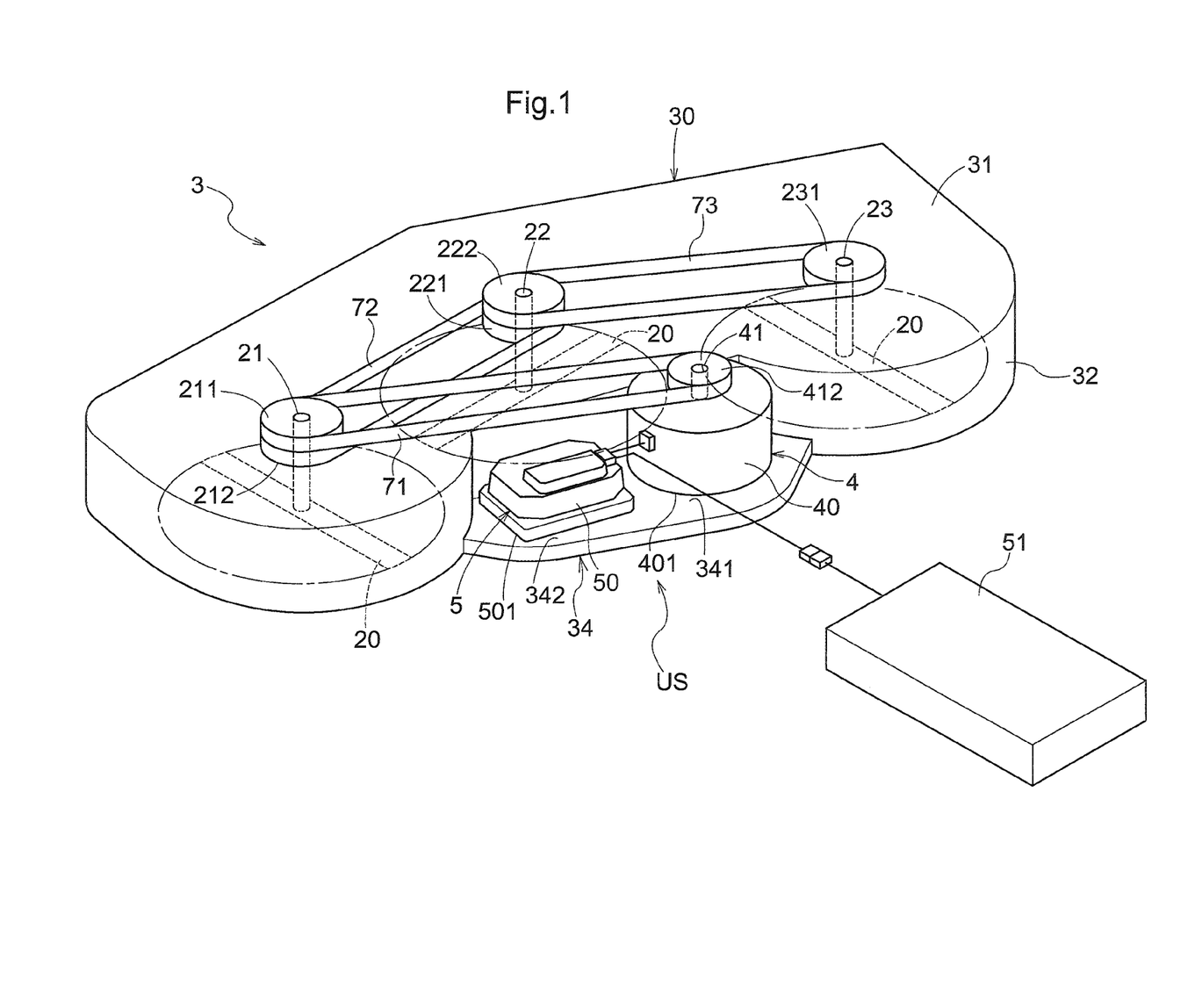
FIG. 1 is a perspective view schematically showing a basic configuration of a three-cutter blade type mower unit mounted on a grass mower machine according to the present invention.
Figure 2:
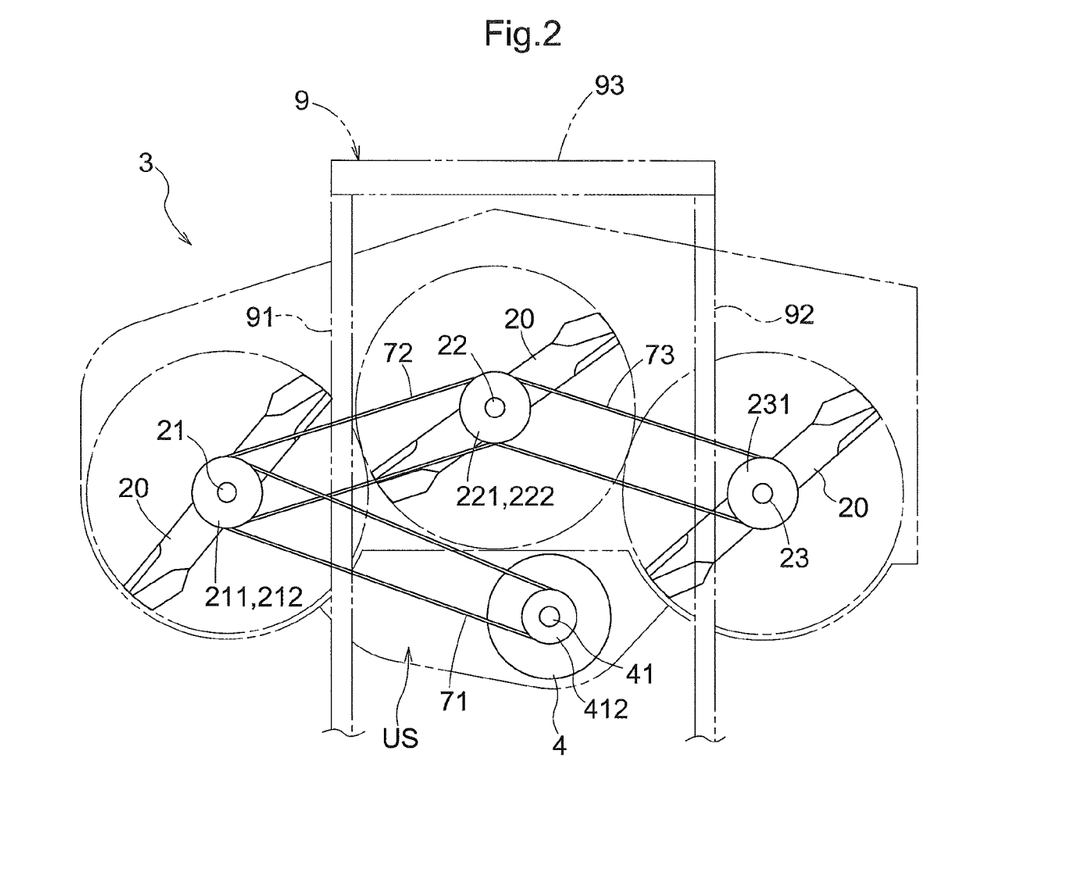
FIG. 2 is a plan view schematically showing positional relation of an electric motor relative to rotation paths of cutter blades.

Before specific embodiments of a grass mower machine according to the present invention are explained, a basic configuration of a mower unit 3 mounted on this grass mower machine will be explained with reference to FIG. 1 and FIG. 2. FIG. 1 is a perspective view schematically showing the mower unit 3. FIG. 2 is a plan view schematically showing positional relation of an electric motor 4 relative to rotation paths of cutter blades 20. A mower deck 30 of the mower unit 3 is suspended from the machine body via a lift mechanism which is not shown in FIG. 1.

Incidentally, in this specification, the "machine body front-rear direction" refers to the direction of a machine body centerline (or may be referred to as "machine body longitudinal axis") that extends horizontally along a traveling direction of the machine body, whereas the "machine body transverse direction" (or may be referred to simply as "transverse direction") refers to the direction that extends horizontally and perpendicularly to the machine body centerline. Further, the "front (front side)" refers to the forward side in the machine body front-rear direction and the "rear (rear side)" refers to the reverse side in the machine body front-rear direction. Also, the "left (left side)" refers to the left side as facing the vehicle body forward direction and the "right (right side)" refers to the right side as facing the vehicle body forward direction.

The mower deck 30 constituting the mower unit 3 includes a top wall 31 and a lateral wall 32 and creates an inside space which is opened to the ground surface. In this inside space, three cutter blades 20 are accommodated. The respective cutter blades 20 are attached to lower ends of a first rotation shaft 21, a second rotation shaft 22, and a third rotation shaft 23. The first rotation shaft 21, the second rotation shaft 22 and the third rotation shaft 23 extend respectively upward through the top wall 31 of the mower deck 30, substantially in the perpendicular direction. In the example shown in FIG. 1, the first rotation shaft 21 is disposed on the left side of the machine body, the second rotation shaft 22 is disposed substantially at the center of the machine body, and the third rotation shaft 23 is disposed on the right side of the machine body, respectively. Rotation paths of mutually adjacent cutter blades 20 are slightly overlapped, and the rotation paths of the three cutter blades 20 continuous from each other in the lateral direction provides a cutter width of this grass mower machine. More particularly, the cutter blade 20 disposed at the center in the machine body transverse direction protrudes more in the machine body forward direction, than the left side cutter blade 20 and the right side cutter blade 20. In other words, the second rotation shaft 22 protrudes more forward in the machine body front-rear direction than the left side first rotation shaft 21 and the right side third rotation shaft 23. With this arrangement, in the inside space of the mower deck 30, there is created a dead space on the outer side of the rotation paths of the three cutter blades 20 as seen in the plan view, in particular, rearwardly of the machine body. This dead space, as shown in FIG. 2, is located rearwardly of the rotation path of the center cutter blade 20 and on the right side of the rotation path of the left side cutter blade 20 and on the left side of the rotation path of the right side cutter blade 20 as seen in the plan view.

In the example shown in FIG. 1, by causing the lateral wall 32 of the mower deck 30 to protrude into this dead space, a useful space US is created at the center rear portion of the mower deck 30. And, in this useful space US, an electric motor 4 is disposed. The electric motor 4 is disposed with its output shaft 41 being oriented upwards, substantially in the perpendicular direction. In this, the output shaft 41 of the electric motor 4 protrudes upward from an upper face of a motor housing 40.

Transmission of rotational power from this output shaft 41 to the first rotation shaft 21, the second rotation shaft 22 and the third rotation shaft 23 proceeds as described next. Firstly, by a first power transmitting body 71 that extends above the electric motor 4 and above the top wall 31 of the mower deck 30, power is transmitted from the output shaft 41 to the first rotation shaft 21. Next, by a second power transmitting body 72 that extends above the top wall 31 on the left side of the mower deck 30 in the machine body transverse direction, the power is transmitted from the first rotation shaft 21 to the second rotation shaft 22. Further, by a third power transmitting body 73 that extends above the top wall 31 on the right side of the mower deck 30 in the machine body transverse direction, the power is transmitted from the second rotation shaft 22 to the third rotation shaft 23.

When the first power transmitting body 71, the second power transmitting body 72 and the third power transmitting body 73 are constituted of chains, belts or the like, an output pulley 412 will be attached to the output shaft 41. Also, an input pulley 211 and an output pulley 212 will be attached to the first rotation shaft 21. And, an input pulley 221 and an output pulley 222 will be attached to the second rotation shaft 22. And, an input pulley 231 will be attached to the third rotation shaft 23. And, the first power transmitting body 71 will be routed around between the output pulley 412 and the input pulley 211. The second power transmitting body 72 will be routed around the output pulley 212 and the input pulley 221. Also, the third power transmitting body 73 will be routed around the output pulley 222 and the input pulley 231. With this arrangement, as two pulleys are attached respectively to the first rotation shaft 21 and the second rotation shaft 22, the combined thickness of the two pulleys becomes the protruding height of the first rotation shaft 21 and the second rotation shaft 22 from the top wall 31 of the mower deck 30. In the example shown in FIG. 1, as for the first rotation shaft 21, the input pulley 211 is disposed upwardly of the output pulley 212. As for the second rotation shaft 22, the output pulley 222 is disposed upwardly of the input pulley 221. Further, the output pulley 412 is attached to the output shaft 41 at the same height as the input pulley 211. With this, the first power transmitting body 71, the second power transmitting body 72 and the third power transmitting body 73 extend parallel with each other and horizontally, thus enabling stable power transmission. Further, the ground heights of the respective upper ends of the output shaft 41, the first rotation shaft 21, the second rotation shaft 22 and the third rotation shaft 23 are substantially the same.

The electric motor 4 is mounted inside the useful space US under a vertical posture (posture with the output shaft 41 extending perpendicularly) on a mount deck 34 fixed to the mower deck 30. To this end, a lower face of the motor housing 40 is formed as a motor mounting face 401. In this, the motor mounting face 401 thermal-conductively contacts a first mounted face 341 formed in the mount deck 34. With this, the mower deck 30 cooled by cut-grass conveying air generated by the cutter blade 20 functions as a "heat sink" for the electric motor 4. In particular, the amount of conveying air by the cutter blade 20 is large in the rear portion of the inner space of the mower deck 30 and its cooling effect for its lateral wall portion is high. So, thermal conductive contact arrangement between this lateral wall portion and the mount deck 34 will be advantageous.

In the example shown in FIG. 1, an inverter section 50 as one constituent of a power supply unit 5 for supplying power to the electric motor 4 is also attached to the mount deck 34. In this, the inverter section 50 is fixed such that an inverter mounting face 501 of the inverter section 50 may contact thermal-conductively a second mounted face 342 formed in the mount deck 34. Therefore, the mower deck 30 acts also as a heat sink for the inverter section 50. The inverter section 50 is connected to the electric motor 4. Further, the inverter section 50 is connected via a power cable to a battery 51 which is one constituent of the power supply unit 5. In an alternative configuration, the inverter section 50 is fixed to the machine body.

Figure 3:
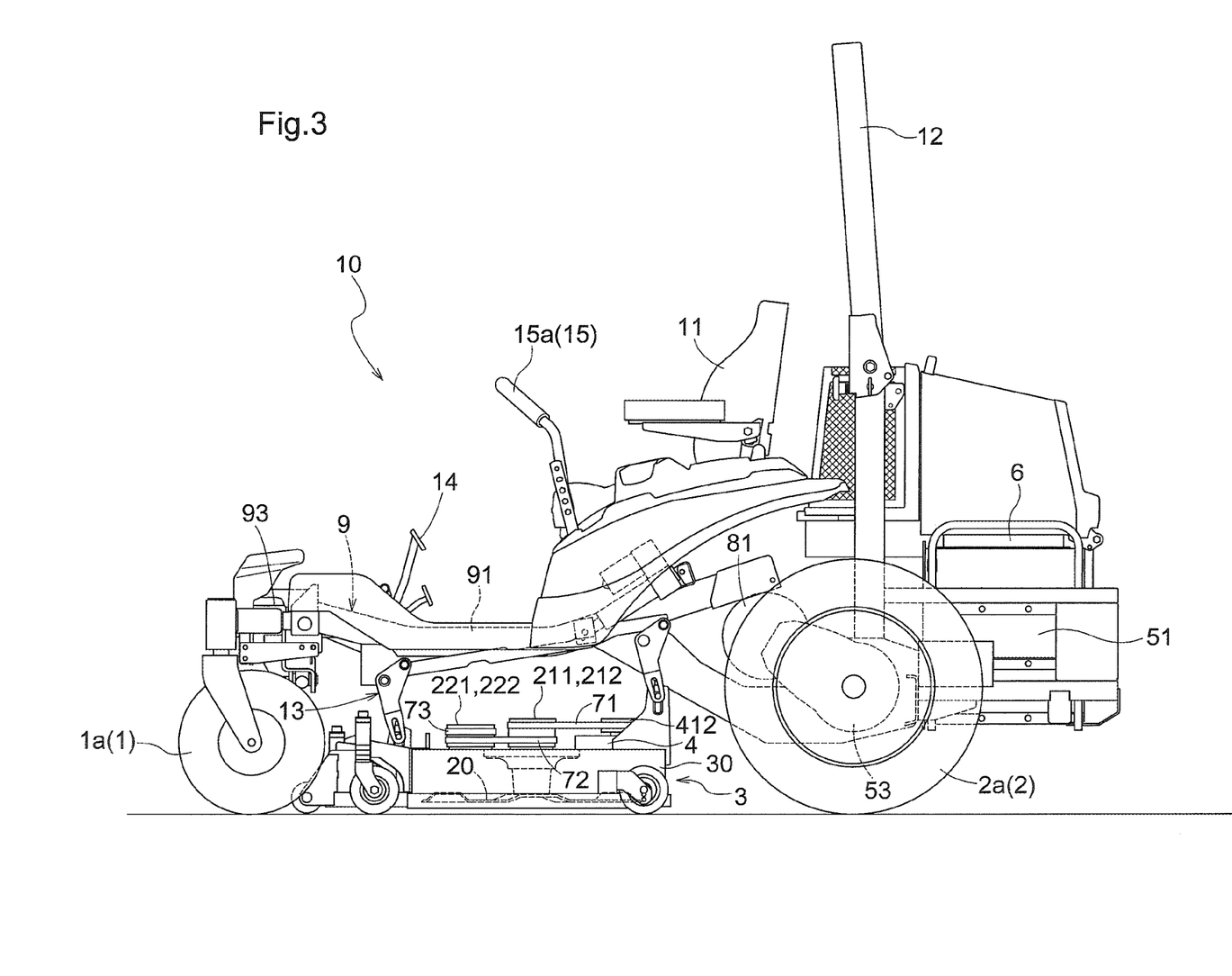
FIG. 3 is a side view of a mid-mount type grass mower machine as one embodiment of the grass mower machine.
Figure 4:
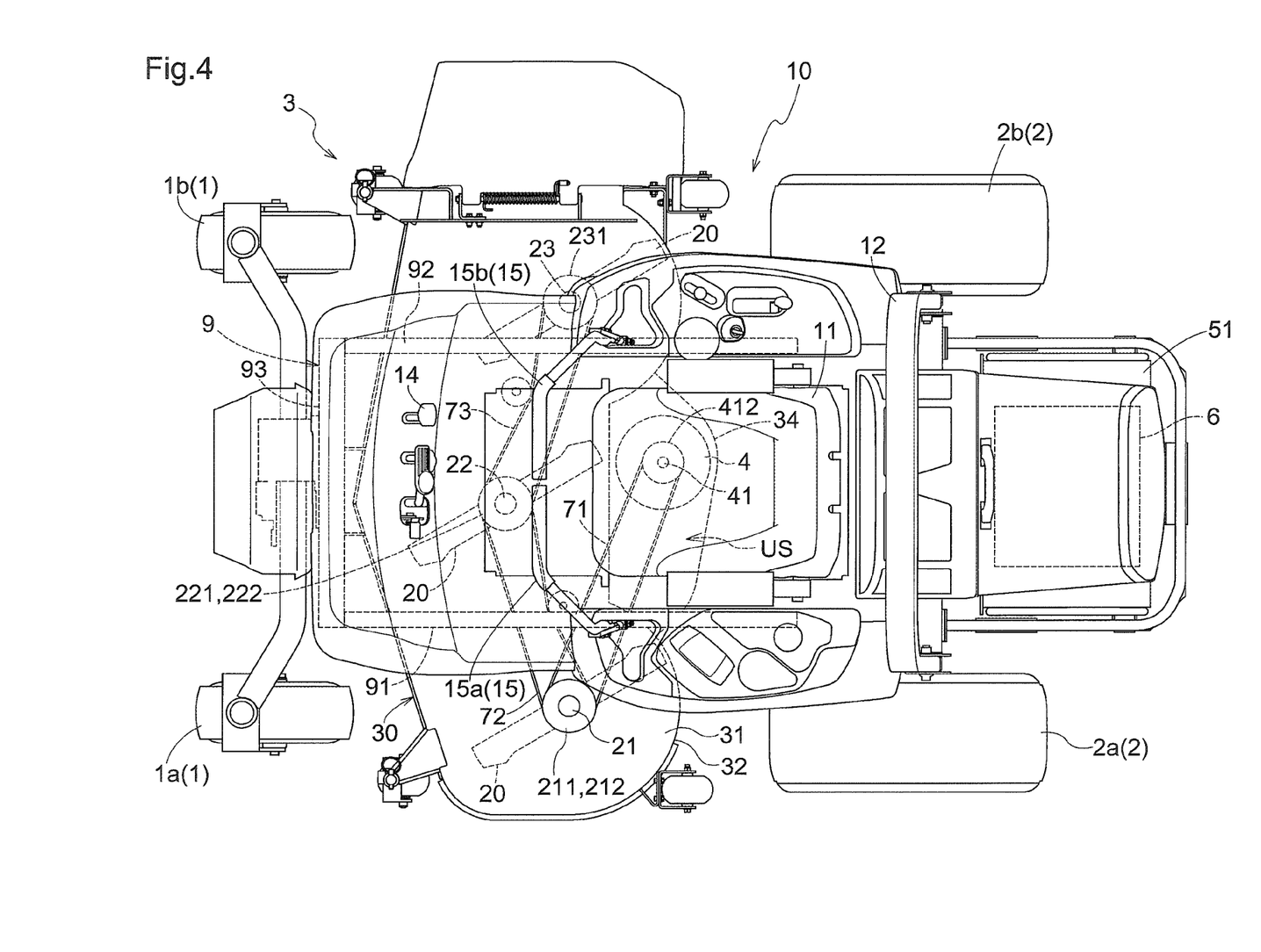
FIG. 4 is a plan view showing the mid-mount type grass mower machine.

Next, with reference to the accompanying drawings, one of specific embodiments of a grass mower machine according to the present invention will be explained. FIG. 3 is a side view of a mid-mount type riding electric grass mower machine as an example of the grass mower machine. FIG. 4 is its plan view.

This grass mower machine includes a frame unit 9 which is a basic configurational component of a machine body 10. This frame unit 9 includes a left frame 91 and a right frame 92 that extend in a vehicle body front-rear direction and a plurality of cross frames 93 interconnecting the left and right frames 91, 92. The frame unit 9 is supported on the ground by a front wheel unit 1 consisting of a freely rotatable caster-type left front wheel 1a and right front wheel 1b and a drive wheel unit 2 consisting of a left rear wheel 2a and a right rear wheel 2b. At a rear portion of the frame unit 9, a battery 51 is mounted. Forwardly of the battery 51, a driver's seat 11 is disposed. From a rear portion of the driver's seat 11, a ROPS (roll-over protection) frame 12 is mounted vertically. Further, the mower unit 3 is suspended from the frame unit 9 to be liftable up/down via a lift link mechanism as a lift mechanism 13 in a lower space of the frame unit 9 between the front wheel unit 1 and the drive wheel unit 2.

Forwardly of the driver's seat 11, there is provided a floor plate as a foot rest for the driver. From this floor plate, a brake pedal 14 protrudes. On opposed sides of the driver's seat 11, there is disposed an operational unit 15 consisting of a left operational lever 15a and a right operational lever 15b that are respectively pivotable about a horizontal pivot axis extending in the machine body transverse direction. Further, in the periphery of the driver's seat 11, though not shown, operational tools such as a cutter blade operational lever, a mower unit lift pedal, etc. are disposed.

Figure 5:
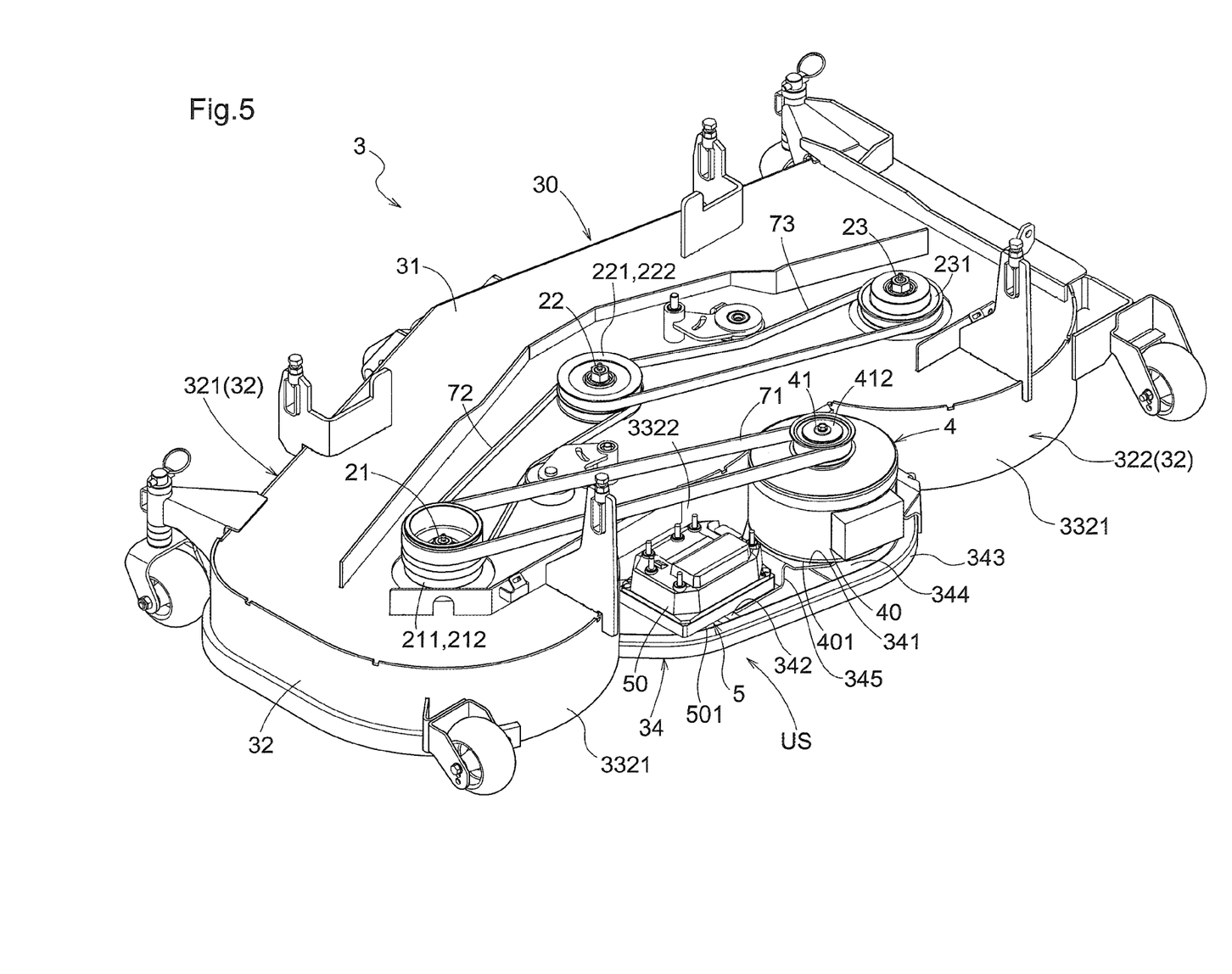
FIG. 5 is a perspective view of the mower unit.
Figure 6:
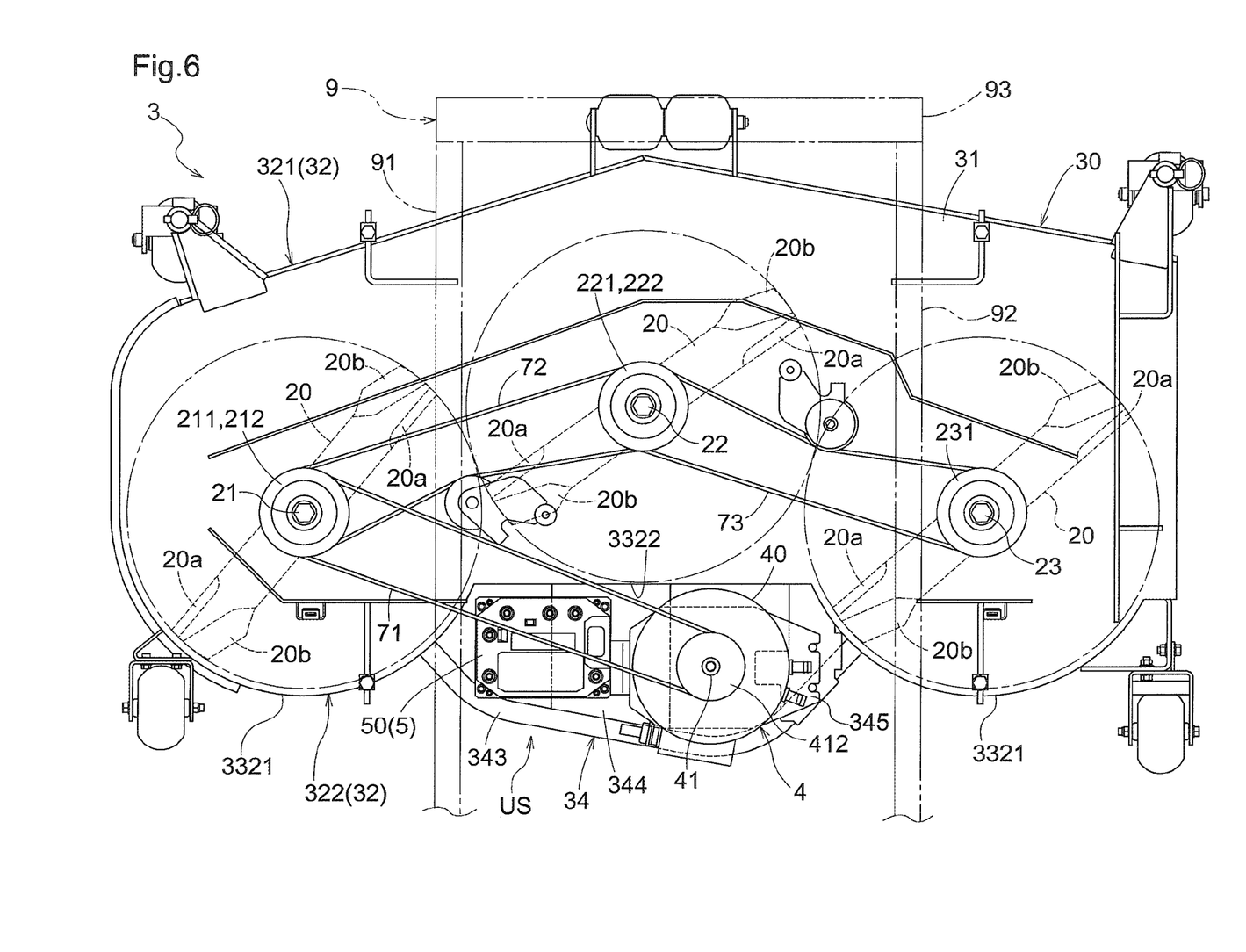
FIG. 6 is a plan view of the mower unit.

The mower unit 3 has a basic configuration corresponding to that described above with reference to FIG. 1 and FIG. 2. The mower unit 3 is a side-discharge type with three cutter blades, as shown in FIG. 5 and FIG. 6. The mower unit 3 includes the mower deck 30 and three rotary type cutter blades 20. The mower deck 30 includes the top wall 31 and the lateral wall 32. The lateral wall 32 is provided to extend downward from an outer circumferential edge of the top wall 31, more particularly, to extend perpendicularly downward from the outer circumferential edge in this embodiment. The lateral wall 32 consists of a front lateral wall 321 extending downward from the outer circumferential edge on the front side of the top wall 31 and a rear lateral wall 322 extending downward from the outer circumferential edge on the rear side of the top wall 31. The right end of the lateral wall 32 is cut away, thus forming a cut grass discharge opening.

The rear lateral wall 322 has a shape extending along the rotation paths of the three adjacent cutter blades 20 as seen in a plan view. Specifically, the rear lateral wall 322 has a shape that consists of left and right two arcuate portions 3321 and a straight portion 3322 which interconnects these arcuate portions linearly as seen in a plan view. The space created among the two arcuate portions 3321 and the straight portion 3322 is a rear area of the rear lateral wall 322, and used as the useful space US. In this embodiment, in the useful space US, there are disposed the vertically mounted electric motor 4 acting as a cutter blade motor and the inverter section 50 for supplying power to this electric motor 4. To this end, in the useful space US, a sub deck, as the mount deck 34, is provided which is disposed with a profile lower than the top wall 31 by an amount corresponding substantially to the height of the electric motor 4.

The mount deck 34 extends to the outer side from the rear lateral wall 322. Also, this mount deck 34 consists of a rod-like support frame 343 and a bridge plate 344. The support frame 343 interconnects the left arcuate portion 3321 with the right arcuate portion 3321 of the rear lateral wall 322. Further, the bridge plate 344 interconnects the support frame 343 with the straight portion 3322 of the rear lateral wall 322. Moreover, a plate-like mounting bracket 345 is bonded to the support frame 343 and the bridge plate 344. In this mounting bracket 345, the first mounted face 341 and the second mounted face 342 are formed. The first mounted face 341 and the second mounted face 342 are formed to extend horizontally with a level difference being formed therebetween. The electric motor 4 includes the cylindrical motor housing 40 and the output shaft 41. The output shaft 41 extends upward from the motor housing 40, more particularly perpendicularly upward therefrom in this embodiment. At the lower end of the motor housing 40, the motor mounting face 401 is formed. This motor mounting face 401 comes into face contact with the first mounted face 341 at the time of mounting of the electric motor 4 to the mount deck 34. In the inverter section 50 too, there is formed an inverter mounting face 501 in a rectangular lower face of the housing. At the time of mounting of the inverter section 50 to the mount deck 34, this inverter mounting face 510 comes into face contact with the second mounted face 342. With this, the entire mower deck 30 including the mount deck 34 formed of steel plate acts as a heat sink for the electric motor 4 and the inverter section 50.

The first rotation shaft 21, the second rotation shaft 22 and the third rotation shaft 23 are disposed side by side from the left side in the machine body transverse direction. And, the respective cutter blades 20 are fixed to the respective lower end regions of the first rotation shaft 21, the second rotation shaft 22 and the third rotation shaft 23. The first rotation shaft 21, the second rotation shaft 22 and the third rotation shaft 23 extend through the top wall 31, thus protruding from this top plate 31 of the mower deck 30.

At the upper end region of the output shaft 41 of the electric motor 4, the output pulley 412 is attached. At the upper end region of the first rotation shaft 21, the input pulley 211 and the output pulley 212 are attached in a two-stage stacked manner with the input pulley 211 being its upper side. At the upper end region of the second rotation shaft 22, the input pulley 221 and the output pulley 222 are attached in a two-stage stacked manner with the input pulley 221 being its lower side. At the upper end region of the third rotation shaft 23, the input pulley 231 is attached.

Figure 7:
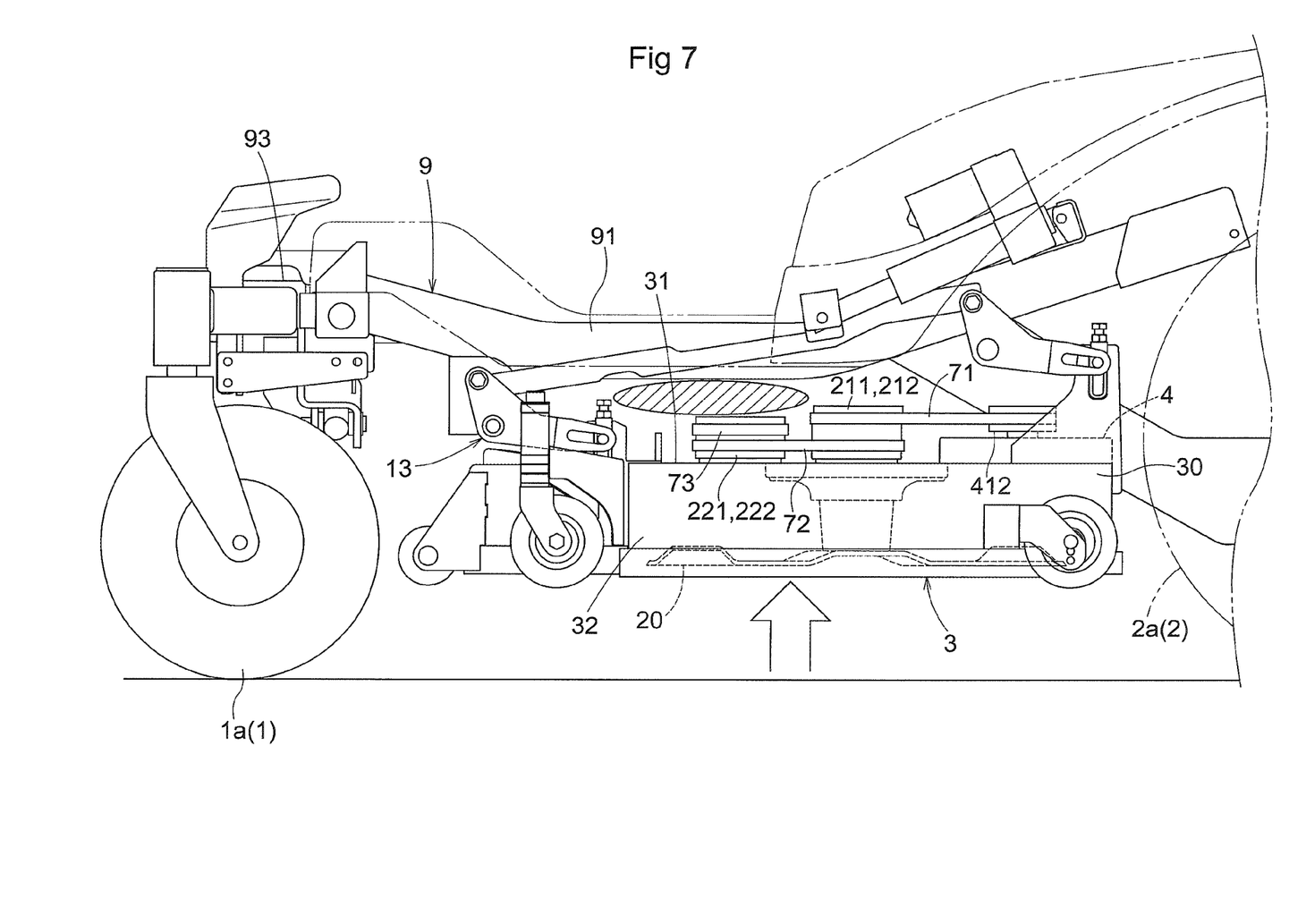
FIG. 7 is a side view illustrating a gap between the mower unit and a machine body frame.

The output pulley 412 and the input pulley 211 have the same ground height, around which a first belt (an example of the first power transmitting body 71) is routed horizontally. Similarly, the output pulley 212 and the input pulley 221 have the same ground height, around which a second belt (an example of the second power transmitting body 72) is routed horizontally. Further similarly, the output pulley 222 and the input pulley 231 have the same ground height, around which a third belt (an example of the third power transmitting body 73) is routed horizontally. With these arrangements, as shown in FIG. 7, the constituent components such as the belts for effecting power transmission from the electric motor 4 to the cutter blades 20 are disposed relatively flatly on the upper face of the top wall 31 of the mower deck 30. This contributes to the ability to secure sufficient lift stroke for the mower deck 30. The upper end region of the second rotation shaft 22 including the input pulley 221 and the output pulley 222 is disposed immediately below the frame unit 9, yet, there still is formed a sufficient gap (represented by diagonal lines in FIG. 7) between this upper end region and the frame unit 9. Incidentally, in this figure, the constituent components such as the electric motor 4, the inverter section 50 and also belts for transmitting power from the electric motor 4 to the cutter blades 20 are shown exposed, but in reality, these respectively will be covered by a cover not shown therein.

The first rotation shaft 21, the second rotation shaft 22 and the third rotation shaft 23 are rotatably supported to the top wall 31 with using bearings. Further, as shown in FIG. 6, at opposed end portions of the strip-like cutter blade 20, there are formed cutter blade edges 20a and also air current generating blades 20b are formed on the rear sides of the respective cutting blade edges. At time of a grass mowing operation, as the grass mower machine travels with rotation of the cutter blades 20 concurrently therewith, cut grass (clippings) cut by the cutter blades 20 will be guided by the conveying air current generated by the air current generating blades 20b of the cutter blades 20 into a baffle plate inside the mower deck 30 and then pass the interior of the mower deck 30 and will eventually be discharged through the discharge opening to the lateral outer side of the mower deck 30.

Figure 8:
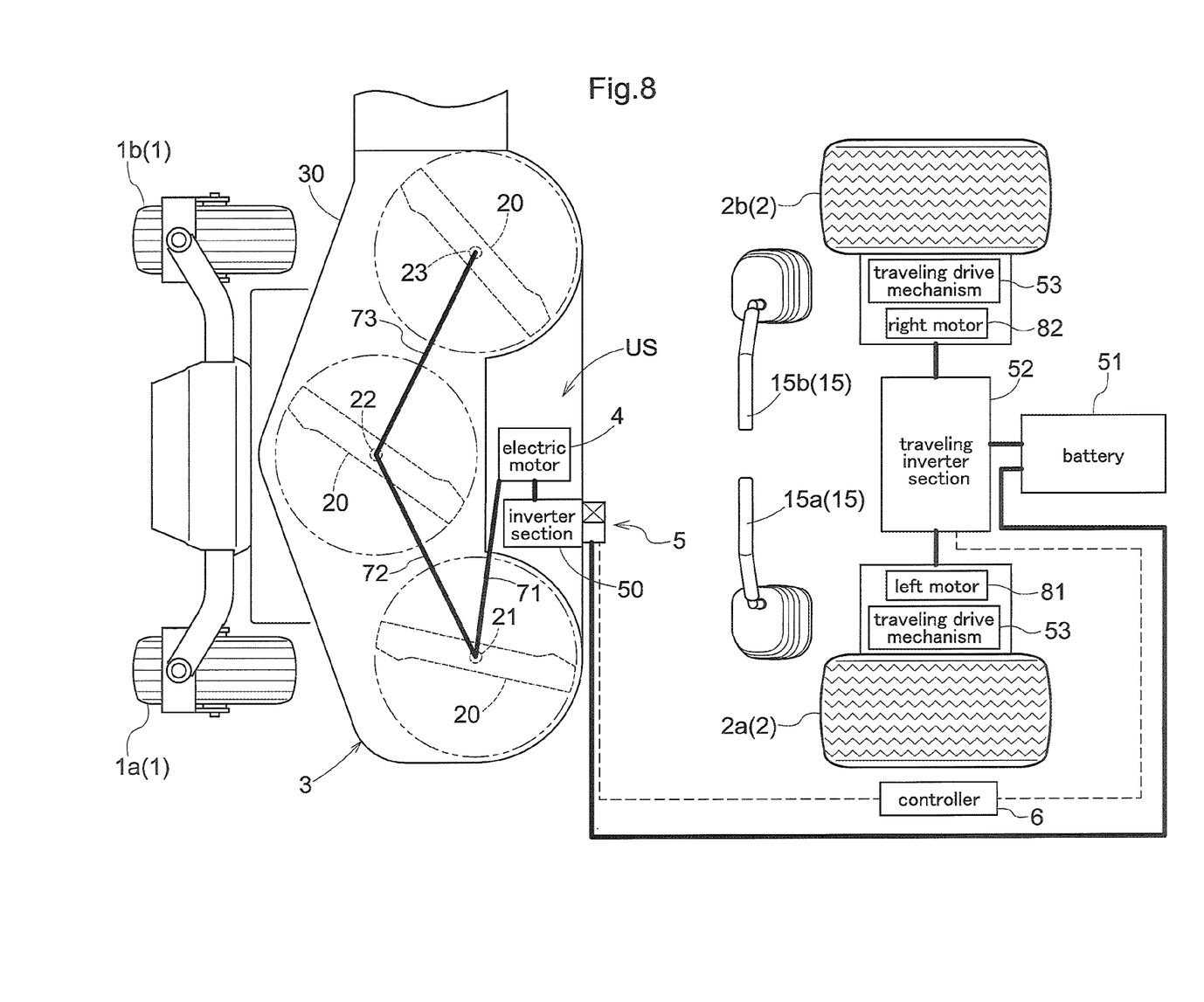
FIG. 8 is an explanatory view illustrating an electric system and a power system of the grass mower machine.

As shown in FIG. 8, this grass mower machine mounts a left motor 81 and a right motor 82 as electric motors for rotatably driving the left rear wheel 2a and the right rear wheel 2b. In accordance of an amount of electric power supplied via a traveling inverter section 52 independently to the left motor 81 and the right motor 82, respectively, rotational speeds of the left motor 81 and the right motor 82 are varied, respectively. With this arrangement, it is possible to cause the rotational speeds of the left rear wheel 2a and the right rear wheel 2b to differ from each other. And, with the resultant speed difference between the left and right rear wheels, the grass mower machine effects a turn. Incidentally, in the instant embodiment, for the sake of power transmission between the left motor 81 and the left rear wheel 2a and between the right motor 82 and the right rear wheel 2b, traveling drive mechanisms 53 are provided respectively. In case the left motor 81 and the right motor 82 comprise "in-wheel" motors, the traveling drive mechanisms 53 can be omitted. Controls of power supply to the left motor 81 and the right motor 82 for traveling and of power supply to the electric motor 4 as a cutter blade motor are effected by a controller 6 which is referred to also as an ECU.

Figure 9:
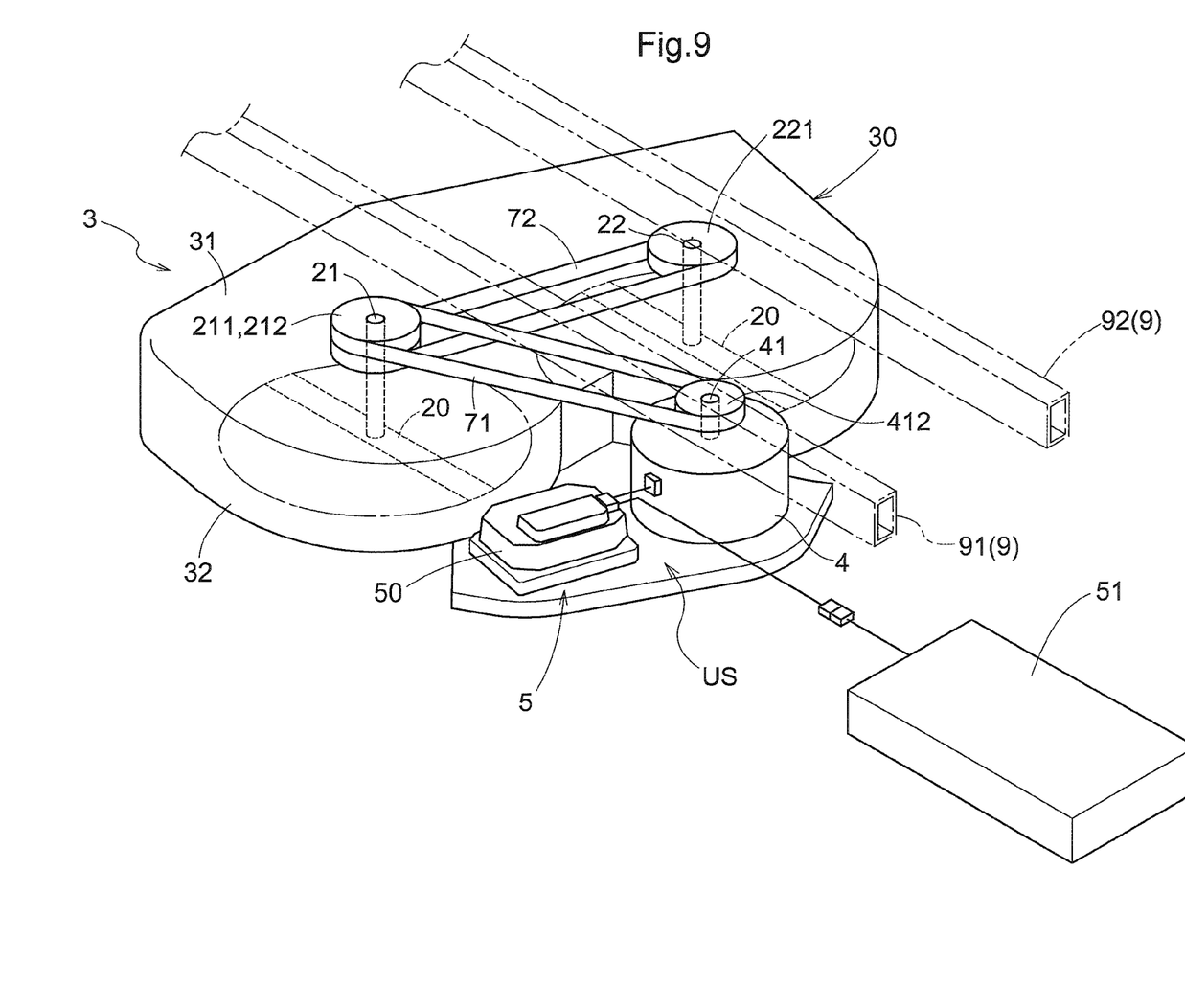
FIG. 9 is a perspective view schematically showing a basic configuration of a two-cutter blade type mower unit as a further embodiment of the mower unit.

OTHER EMBODIMENTS (1) In the foregoing embodiment, the mower unit 3 is the side discharge type having three cutter blades. However, any other type of mower unit 3 can be used. FIG. 9 shows a two cutter blade side discharge type as another type of the mower unit 3. In this further embodiment, in the inner space of the mower deck 30, two cutter blades 20 are disposed side by side in the machine body transverse direction. The respective cutter blades 20 are attached to the respective lower ends of the first rotation shaft 21 and the second rotation shaft 22. The first rotation shaft 21 is disposed on the left side away from the left frame 91. Further, the second rotation shaft 22 is disposed substantially below the right frame 92. The output shaft 41 of the electric motor 4 is disposed downwardly between the left frame 91 and the right frame 92. By the first power transmitting body 71 that extends above the electric motor 4 and above the top wall 31 of the mower deck 30, power is transmitted from the output shaft 41 to the first rotation shaft 21. Further, by the second power transmitting body 72 that extends above the top wall 31 on the left side of the mower deck 30 in the machine body transverse direction, power is transmitted from the first rotation shaft 21 to the second rotation shaft 22. In this case too, belts are employed as the first power transmitting body 71 and the second power transmitting body 72. The output shaft 41 mounts the output pulley 412, the first rotation shaft 21 mounts the input pulley 211 and the output pulley 212 and the second rotation shaft 22 mounts the input pulley 221. The first power transmitting body 71 is routed around the output pulley 412 and the input pulley 221. Further, the second power transmitting body 72 is routed around the output pulley 212 and the input pulley 221. In this arrangement, two pulleys are mounted on the first rotation shaft 21. Thus, compared with the second rotation shaft 22, the first rotation shaft 21 protrudes more from the top wall 31 of the mower deck 30. However, since the first rotation shaft 21 is more distant to the left side than the left frame 91, at the time of elevation of the mower deck 30, there occurs no interference of the input pulley 211 and the output pulley 212 with the frame unit 9. Further, the layout of the electric motor 4 can be set irrelevant from the layout of the cutter blades 20. Therefore, it is easy to dispose the output shaft 41 of the electric motor 4 at a position not interfering with the frame unit 9, at the time of elevation of the mower deck 30.

(2) In the foregoing embodiment and the alternative embodiment above, the inverter section 50 is disposed on the mower deck 30. However, alternatively, it can be disposed on the machine body 10.

(3) In the foregoing embodiment, the grass mower machine comprises a so-called zero-turn type vehicle having the left rear wheel 2a and the right rear wheel 2b of the drive wheel unit 2 being drivable independently of each other. Alternatively, it can be a vehicle having the left rear wheel 2a and the right rear wheel 2b being coupled to each other via a differential mechanism.

The invention claimed is:
1. A grass mower machine comprising:
a frame unit that extends in a machine body front-rear direction;
a mower deck that is attached to the frame unit via a lift mechanism to be adjustable in its ground height and that protrudes from the frame unit in a machine body transverse direction;
a first rotation shaft that extends through a top wall of the mower deck and that extends upwards outside of the frame unit in the machine body transverse direction;
a second rotation shaft that extends through the top wall of the mower deck and spaced from the first rotation shaft in the machine body transverse direction;
cutter blades attached respectively to the first rotation shaft and the second rotation shaft inside the mower deck;
an electric motor that is disposed on an outer side of rotation paths of the cutter blades as seen in a plan view;
an output shaft of the electric motor that extends upwardly from the electric motor;
a first power transmitting body that extends above the top wall of the mower deck to transmit power from the output shaft to the first rotation shaft; and
a second power transmitting body that extends above the top wall of the mower deck to transmit power from the first rotation shaft to the second rotation shaft,
wherein the mower deck includes a lateral wall that extends downward from an outer circumferential edge of the top wall,
wherein a mount deck extends to the outer side of the mower deck from the lateral wall of the mower deck,
wherein a rear region of the lateral wall comprises a space formed above the mount deck along rotation paths of the adjacent cutter blades and surrounded by a plurality of arcuate portions and a straight portion sandwiched by the arcuate portions, wherein the plurality of arcuate portions extend rearwardly from the straight portion, and
wherein the electric motor is disposed on a top surface of the mount deck in the space, and
wherein the electric motor and the arcuate portions overlap each other when viewed from a lateral side of a machine body.
2. The grass mower machine according to claim 1, wherein:
the mount deck forms a mounted face to which the mounting face of the electric motor comes into thermally conductive contact.

3. The grass mower machine according to claim 1, wherein the electric motor is fixed to a part of the mower deck other than the top wall of the mower deck.

* * * * *